G. W. EMRICK.
DRILL CHUCK.
APPLICATION FILED JUNE 30, 1913.
1,109,121.
Patented Sept. 1, 1914.
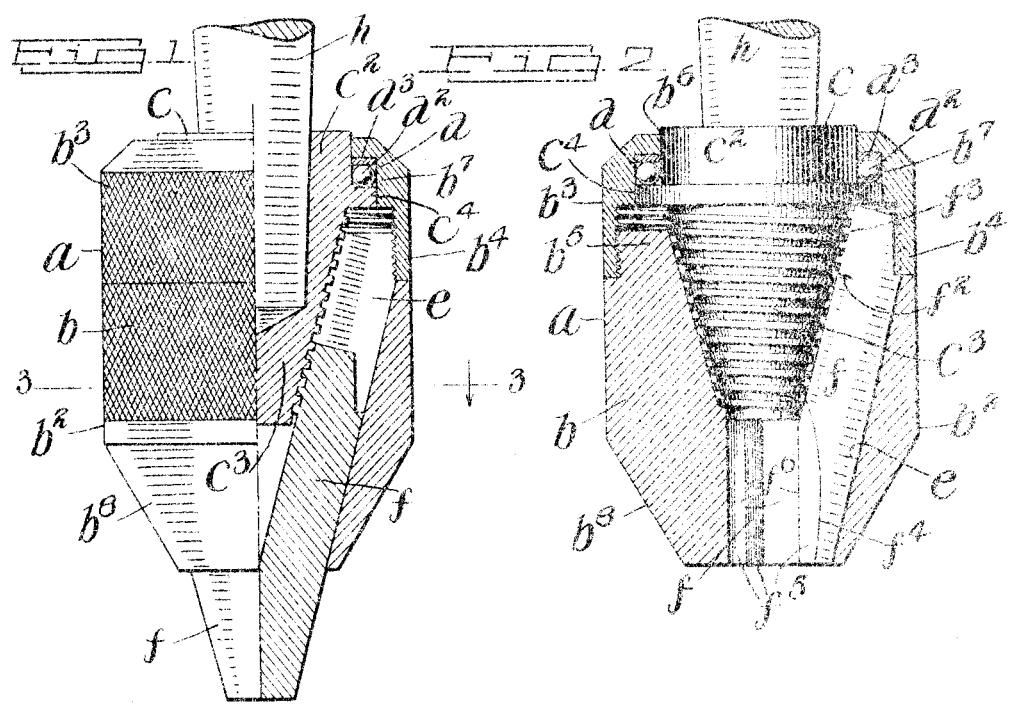
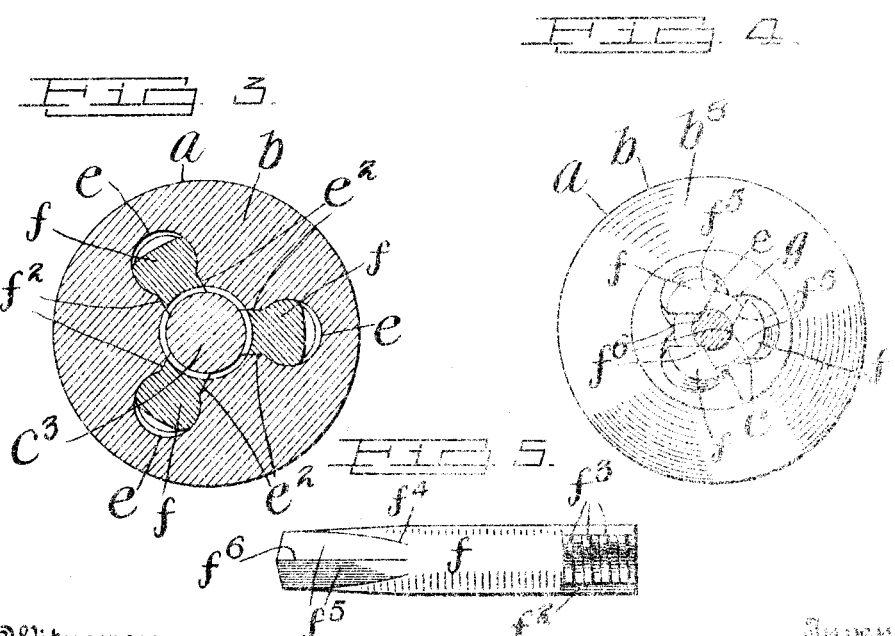
Witnesses:
H. L. Thompson
S. Andrews
Inventor
George W. Emrick,
By his Attorney

UNITED STATES PATENT OFFICE.

GEORGE W. EMRICK, OF BROOKLYN, NEW YORK.

DRILL-CHUCK.

1,109,121.

Specification of Letters Patent.

Patented Sept. 1, 1914.

Application filed June 30, 1913. Serial No. 776,487.

*To all whom it may concern:*

Be it known that I, GEORGE W. EMRICK, a citizen of the United States, and residing at Brooklyn, in the county of Kings and State of New York, have invented certain new and useful Improvements in Drill-Chucks, of which the following is a specification, such as will enable those skilled in the art to which it appertains to make and use the same.

This invention relates to drill chucks, and the object thereof is to provide an improved device of this class which is simple in construction and operation and in which a drill may be quickly and easily secured, and from which said drill may be as quickly and easily detached when necessary, both these operations being performed by simply turning the shell portion of the body of the chuck, while the central top portion of said chuck is held stationary by the spindle or shank employed in connection therewith and by means of which the chuck is connected with the machine by which it is operated; a further object being to provide a drill chuck involving a central top portion or head with which, in practice, the spindle or shank is connected and on which is mounted a rotatable shell portion, said central top portion or head being provided with a tapered or conical and threaded part, and the said chuck being also provided with longitudinally movable gripping jaws mounted between the conical threaded part on the rotary shell portion and being adapted to be moved longitudinally by turning the said shell portion which operation, when said shell portion is turned in one direction, will project said jaws and draw them together so as to cause them to securely grasp and hold the shank of a drill or other tool, and when turned in the opposite direction, will withdraw said jaws into the chuck body and cause them to release the shank of the said drill or other tool.

The invention is fully disclosed in the following specification of which the accompanying drawing forms a part, in which the separate parts of my invention are designated by suitable reference characters in each of the views, and in which:—

Figure 1 is a side and sectional view of my improved chuck; Fig. 2 a view similar to Fig. 1, but showing the shell portion only in section; Fig. 3 a transverse section on the line 3—3 of Fig. 1; Fig. 4 a bottom plan view of the chuck, and; Fig. 5 an inside view of one of the jaws of the chuck.

In the practice of my invention, I provide a chuck body $a$ comprising a rotary shell portion $b$ and a central top portion or head $c$ comprising a cylindrical top part $c^2$, and a tapered and threaded bottom part $c^3$, and between which parts is an annular flange $c^4$.

The rotary shell portion $b$ comprises a cylindrical bottom part $b^2$ which incloses the conical threaded part of the central top portion or head $c$, and a cylindrical cap part $b^3$ having a depending rim $b^4$ provided with an interior thread and adapted to be screwed onto a reduced top $b^5$ of the bottom part $b^2$.

The cylindrical cap part $b^3$ is provided with a central opening $b^6$ through which the top part $c^2$ of the top portion or head $c$ passes when the parts of the chuck body are assembled, and in said cap and around the top part $c^2$ of the top portion or head $c$ is an annular chamber $b^7$ in the bottom portion of which the flange $c^4$ of the part $c$ closely fits, and this construction forms a ball race $d$ in which are placed steel balls $d^2$, and placed on the balls $d^2$ is a hard steel annular gasket $d^3$ which takes up the thrust movement or strain in the operation of the device, and with this construction, the shell $b$ of the chuck body $a$ is free to turn on the central top portion or head $c$ in either direction, when the device is not in use.

The bottom part $b^2$ of the shell portion $b$ of the chuck body $a$ is tapered or conical in form, as shown at $b^8$, and the interior thereof, the inner walls of which at the top thereof are tapered to correspond with the conical threaded part $c^3$, is provided with longitudinal bores $e$, three of which are preferably employed and in which are mounted oblong jaws $f$ movable longitudinally of the central axis of the chuck body and which have a downward converging or upward diverging movement according to the direction in which the shell $b$ of the chuck body $a$ is turned.

The jaws $f$ or the upper parts thereof are provided with ribs $f^2$ which pass through corresponding slots or grooves $e^2$ which form a communication between the bores $e$ and the interior chamber in the bottom part $b^2$ of the shell $b$, and the top portions of said jaws $f$ or the ribs $f^2$ thereof, are provided with transverse threads $f^3$ which mesh with the thread on the part $c^3$ of the central top portion of the head $c$. The ribs $f^2$ of the jaws $f$ and the threads $f^3$ extend for less than a quarter of the length of said jaws, and the inner faces of the lower end portions of said jaws are cut away, as shown at $f^4$ so that said faces are parallel with the central axis of the chuck body, and each of said jaws is preferably provided with two faces $f^5$ which form a longitudinal gripping bead or edge $f^6$ whereby said jaws are adapted to grasp and hold the shank $g$ of a drill or other tool inserted between the same.

Fig. 1 of the accompanying drawing shows the jaws $f$ projected to the fullest extent, and Fig. 2 shows them withdrawn into the body of the chuck head, while Fig. 4 shows said jaws projected sufficiently to grasp and hold the shank $g$ of a drill or other tool, in which operation, the said jaws may be projected to any extent between the positions shown in Figs. 1 and 2, but it will be understood, that the drill, or the shank thereof, cannot be passed between the lower ends of the jaws $f$, in the position shown in Fig. 1, and in the use of the chuck the jaws $f$ are always projected more or less, the extent of their projection depending on the transverse dimensions of the shank of the drill to be held thereby.

It will be understood that the jaws $f$ are projected by turning the shell $b$ in one direction, and withdrawn into the body of the chuck by turning said shell in the opposite direction, and in the operation of this device, supposing the parts to be in the position shown in Fig. 2, the shell $b$ is turned slightly in the direction to project the jaws $f$ after which, the shank $g$ of the tool is inserted between said jaws, after which said shell is turned so as to further project the jaws and cause them to grasp and hold the tool, and the turning of the chuck body by the spindle or shank $h$, by which it is connected with the machine, increases the pressure of the jaws $b$ on the shank of the tool and causes said jaws to securely grasp and hold the same, and when it is desired, to release the tool, all that is necessary is to stop the machine and turn the shell $b$ in the opposite direction, which operation withdraws the jaws $f$ and releases the tool.

In the construction shown, the threads $f^3$ of the jaws $f$ extend for less than a quarter of the length of said jaws, and the object of this construction is to insure that the threads on said jaws will never extend below the bottom of the conical threaded part $c^3$ of the central top portion or head $c$, this result being clearly shown in Fig. 1, in which the jaws $f$ are in their lowest, or most fully projected position, and the object of this invention is to prevent the accumulation of scrap, dust or other substances in said threads, which would result, if said threaded parts of the jaws $f$ extended below the conical threaded part $c^3$, in any position of said jaws.

The formation of the bores $e$ in which the jaws $f$ are longitudinally movable, the slots or grooves $e^2$ and the webs or ribs $f^2$ on the jaws $f$ prevent the rotation of said jaws in said bores and hold them in operative position at all times, but this result may be accomplished in other ways, and changes in and modifications of these, as well as other features of the construction herein shown and described, may be made, within the scope of the appended claims, without departing from the spirit of my invention or sacrificing its advantages.

Having fully described my invention what I claim as new and desire to secure by Letters Patent is:—

A chuck body, comprising an outer rotary shell portion and an inner central top or head portion, said head portion being provided with a downwardly extending conically tapered part threaded throughout its length, and said shell portion being provided with a correspondingly tapered chamber to receive said part, and which is provided with a downward extension which opens through the bottom of said casing, said casing being also provided in the walls thereof with jaw bores which communicate with said chamber through slots formed in connection therewith, said slots and said bores being also in communication with the downward extension of said chamber, and jaws mounted in said jaw bores and movable longitudinally and having longitudinal ribs movable in said slots and provided at their upper ends with threads which engage the threads of the conically tapered part, said jaws having a downward and converging or an upward and diverging movement according to the direction in which said shell is turned.

In testimony that I claim the foregoing as my invention I have signed my name in presence of the subscribing witnesses this 28th day of June 1913.

GEORGE W. EMRICK.

Witnesses:
C. MULREANY,
S. ANDREWS.